United States Patent Office

2,865,901
Patented Dec. 23, 1958

2,865,901

BROMINATION OF ISOOLEFIN-POLYOLEFIN COPOLYMERS WITH BROMINE-CONTAINING ACTIVATED CHARCOAL

Ernest Jack Buckler and Douglas Cameron Edwards, Sarnia, Ontario, Canada, assignors to Polymer Corporation Limited, Sarnia, Ontario, Canada, a corporation of Canada No Drawing. Application March 21, 1956
Serial No. 572,803

13 Claims. (Cl. 260—85.3)

This invention relates to a process for brominating isoolefin-polyolefin copolymers. More particularly, it relates to the process for brominating a polymer composed of a major portion of an isoolefin containing 4 to 8 carbon atoms and a terminal methylene group connected by a double bond to another carbon atom and a minor portion of a polyolefinic hydrocarbon.

The isoolefin-polyolefin copolymers preferably used in the present invention are known as "Butyl rubbers." Herein, "Butyl rubber" is defined as a vulcanizable elastic copolymer of isobutylene and small amounts of a diolefin such as, for example, isoprene or butadiene-1,3.

These Butyl rubbers are very useful since they are very impervious to air, but they suffer the disadvantage that their adhesion to other vulcanized polymeric surfaces is very poor. A number of suggestions have been made to correct this obvious disadvantage, the most promising suggestion being that disclosed in U. S. Patent No. 2,631,984 issued March 17, 1953 to Richard A. Crawford and Richard T. Morrissey. In that patent, it was disclosed that good bonds may be obtained between Butyl rubber and other polymers by the use of incompletely brominated Butyl rubber or by the use of tie-gums or cements prepared from the brominated polymer. (A tie-gum may be defined as a thin sheet of material placed between the faces of two other sheets of material, which normally would not adhere to each other, for the purpose of effecting such adhesion.)

However desirable the use of such brominated polymers may be, their use is limited by the manner of brominating the Butyl rubber. It is known that the methods as taught by the prior art, although satisfactory, are nevertheless awkward, time-consuming or expensive. For example, one method consisted of preparing a solution or dispersion of the interpolymer in an appropriate normally liquid organic solvent or diluent and adding the brominating agent either as such or in solution to the interpolymer solution or dispersion thereby to form the brominated interpolymer in solution or dispersion in the solvent or diluent. However, if the bromination is carried out in such a manner, the dissolution and recovery steps are both time-consuming and expensive. On the other hand, if the bromination is carried out in the polymerization reactor before the polymer is recovered, some undesirable bromination of the unreacted monomers takes place. In addition, the bromine also tends to attack the expensive polymerization equipment. Again, if the bromination is carried out by adding bromine-releasing chemicals such as N-bromosuccinimide or N-bromoacetamide to mill-mixes of the polymer, other difficulties arise. In the first place, the bromine-releasing chemical must be heated either during or after the mixing step in order to release the bromine. Higher temperatures result in increased gel formation in the polymer so treated and a tie-gum or cement prepared from such polymer is not as smooth as one prepared from a polymer containing less gel.

It is the principal object of this invention to provide an improved process for brominating Butyl rubber.

In accordance with the process of the present invention this object is achieved by intimately commingling an isoolefin-polyolefin copolymer with bromine-containing activated carbon black.

Among the preferred isoolefin-polyolefin copolymers which may be used in the practice of the present invention are, for example, the copolymers of a major proportion, desirably from 70 to 99% by weight, of an isoolefin generally containing from 4 to 8 carbon atoms and a terminal methylene group connected by a double bond to a carbon atom such as, most desirably, isobutylene or, alternatively, 3-methylbutene-1, 4-methylpentene-1, 2-ethylbutene-1, 4-ethylpentene-1 or the like, or a mixture of such isoolefins, with a minor proportion, desirably from 30 to 1% by weight of a polyolefinic hydrocarbon generally containing from 4 to 18 carbon atoms, or two, three or more such hydrocarbons, including the following:

(1) Acyclic or open-chain conjugated diolefins such as butadiene-1,3, isoprene, 2,4-dimethylbutadiene 1,3, piperylene, 3-methylpentadiene-1,3, hexadiene-2,4, 2-neopentylbutadiene-1,3, and the like;

(2) Acyclic non-conjugated diolefins such as dimethallyl and its homologs containing 2 to 6 carbon atoms interposed between two isopropenyl radicals, 2-methyl-hexadiene-1,5, 2-methylpentadiene-1,4, 2-methylheptadiene-1,6, 2-methylheptadiene-1,6, 2-methylheptadiene-1,4, and other tertiary non-conjugated diolefins having one double bond in the terminal position attached to a tertiary carbon atom;

(3) Alicyclic diolefins, both conjugated and non-conjugated, such as cyclopentadiene, cyclohexadiene, 1-vinylcyclohexene-3, 1-vinylcyclohexane-1, 1-vinylcyclopentene-1, 1-vinylcyclobutene-2, decylopentadiene, and the like as well as monocyclic diolefinic terpenes such as dipentene, terpinenes, terpinolene, phellandrenes, sylvestrene and the like;

(4) Acyclic triolefins such as 2,6-dimethyl-4-methyleneheptadiene-2,5, 2-methylhexatriene-1,3,5, and other conjugated triolefins, as well as myrcene, ocimene, allo-ocimene and the like;

(5) Alicyclic triolefins such as fulvene, 6,6-dimethylfulvene, 6,6-methylethylfulvene, 6-ethylfulvene, 6,6-diphenylfulvene, 6-phenylfulvene, and other fulvenes of the formula

wherein each R is hydrogen, alkyl, cycloalkyl or aryl; as well as other alicyclic triolefins such as 1,3,3-trimethyl-6-vinylcyclohexadiene-2,4, cycloheptatriene, etc.; and (6) Higher polyolefins such as 6,6-vinylmethylfulvene (a tetraolefin) and 6,6-diisopropenylfulvene (a pentaolefin).

Of the above-mentioned preferred polymers, it has been found most desirable in preparing the brominated derivatives utilizing the solid plastic copolymers of isobutylene with small amounts of isoprene or butadiene-1,3, of the character of "Butyl rubber."

The activated carbon blacks which may be used in the present invention include activated channel black, activated furnace black, activated thermal black, activated acetylene black and activated charcoal. The preferred carbon blacks are the activated charcoals, which include activated animal charcoal, activated vegetable charcoal and activated mineral charcoal. Any well-known procedure may be used in the activation of the blacks. Examples include carbonizing the original material in the presence of hygroscopic substances, and heating the primary (not activated) charcoal at high temperatures in the presence of activating gases such as steam. The carbon blacks must be activated sufficiently so as to enable them to absorb the required minimum amount of bromine. This amount of bromine is, of course, related to the amount of activated carbon black used. It has been found that, to prepare a suitable brominated butyl polymer, it is necessary to react the polymer with at least 2 percent by weight and preferably 3–4 percent by weight of bromine. It is conventional practice to use 50 parts by weight of carbon black per 100 parts by weight of rubber in the compounding of rubber. Hence, if such amount of bromine containing activated carbon black is to be used in the present invention the carbon black must be activated sufficiently to enable it to absorb at least 4% of its weight of bromine.

The adsorption of the bromine by the activated carbon black may be carried out by any convenient method, such as vapour phase adsorption or liquid phase adsorption. In vapour phase adsorption, the activated carbon black is tumbled in an atmosphere of bromine vapours. In liquid phase adsorption, liquid bromine is added directly to the carbon black in a suitable container, before mixing. Both methods were used in preparing the bromine-containing activated carbon blacks used in the present invention. The methods are as follows:

EXAMPLE A.—VAPOUR PHASE ADSORPTION

A cylindrical one-gallon glass jug about 7 inches in diameter and 9 inches high to the shoulder, having a neck about 1 inch in inside diameter, was fitted with an auxiliary flask having a cylindrical neck approximately 3 inches long and slightly less than 1 inch in outside diameter, and a flattened bulb approximately 3 inches wide and 1 inch high. A ¼ inch length of "Tygon" tubing was stretched over the neck of the auxiliary flask so as to form a seal against the inner surface of the neck of the gallon jug when the auxiliary flask was installed. (Tygon is a series of modified halide polymers, condensation resins, and diene derivatives, usually a copolymer of vinyl chloride and vinyl acetate, and is very inert to attack by many chemicals compounded to produce synthetic rubber like materials with a wide range of physical properties, sold by United States Stoneware Co., Akron, Ohio.) The desired amount of activated carbon black was placed in the gallon jug and the desired amount of bromine was pipetted into the auxiliary flask. The jug was placed on its side, and the auxiliary flask was installed in the neck of the jug. The assembly was placed on a roller so that the black was tumbled continuously as bromine vapour entered the jug through the neck of the auxiliary flask. The jug was removed from the roller and capped when all of the bromine had vaporized and had been absorbed, or when further tumbling produced no apparent reduction in the concentration (colour) of the bromine vapours.

EXAMPLE B.—LIQUID PHASE ADSORPTION

The desired quantity of activated carbon black was placed into a jug similar to the one described above. The desired amount of liquid bromine was added directly to the contents of the jug in increments of about 10 ml. After each addition, the jug was capped and shaken gently by hand. The reason for the addition of bromine in small amounts rather than in one large portion is that the adsorption of liquid bromine on the activated carbon results in the evolution of a considerable amount of heat.

The preferred bromine-containing activated carbon black is activated charcoal with adsorbed bromine thereon. The activated charcoal will adsorb up to 50% of its weight of bromine and this bromine-containing activated charcoal may be incorporated easily into the butyl polymer. The odour of bromine from the bromine-containing charcoal and from the Butyl rubber-bromine-containing charcoal mixture is very slight.

Channel black, furnace black, thermal black and acetylene black may be activated sufficiently to adsorb 5–10% of their weight of bromine. The use of these blacks raise a few minor problems, such as the fact that they tend to form a layer on the back roll of a mill, and that the blacks and the compounded polymer emit a somewhat stronger odour of bromine than the charcoal. However, they may be used very successfully in the process of the present invention.

The relative amounts of bromine and activated carbon black used are important but not critical. Amounts of bromine of about 2–35 parts bromine per 100 parts butyl polymer give satisfactory adhesion results. The optimum amounts, however, are normally about 4–9 parts bromine per 100 parts butyl polymer.

The amounts of activated carbon black incorporated into the brominated Butyl rubber will, of course, depend upon the percent bromine adsorbed on the activated carbon black and the amount of bromine desired to be reacted with the Butyl rubber. In general, however, amounts of bromine-containing activated carbon blacks of about 4–70 parts black per 100 parts Butyl rubber are satisfactory. The most desired ranges are about 20–60 parts black per 100 parts Butyl rubber.

The following examples are given to illustrate the invention. In these examples the Butyl rubber used was an isobutylene-isoprene copolymer containing 97.8 weight percent isobutylene and 2.2 weight percent isoprene and having a 1.8 mole percent unsaturation. All figures given are in parts by weight unless otherwise specified, and all adhesion testing was done at 77° F.

*Example 1*

The following example is given to show the use of a process not in accordance with the process of the present invention.

Unactivated easy processing channel black, unactivated acetylene black, and unactivated thermal black were each brominated according to the process of Example A. It was found that the easy processing channel black (hereinafter termed EPC black) adsorbed 6% of its weight of bromine, the acetylene black adsorbed 6% of its weight of bromine, and the thermal black adsorbed 3% of its weight of bromine.

200.0 gram samples of Butyl rubber containing about 1.8 mole percent unsaturation were blended, on a cold mill at 100° F., with 100.0 grams of each of the above described carbon blacks, both in their original (unbrominated), and in their brominated states. These mixes were then compounded according to the recipes given in Table I to give a series of tie-gum stocks. These stocks were then formed into sheets of 0.01 inch thickness. Then pieces were cut out of the sheet to serve as tie-gums between 0.10 inch thick plies of the Butyl tread-stock, as shown in Table II, and the Krylene-natural rubber carcass-stock shown in Table III. The three plies were then cured together for 40 minutes at 307° F. (Krylene is the trade name for a type of low temperature polymerized (butadiene-1,3)-styrene polymer containing about 28% styrene, manufactured by Polymer Corporation Limited, Sarnia, Ontario, Canada.) The adhesion tests are given in Table IV.

TABLE I.—TIE-GUM COMPOUND RECIPES

| Recipe No. | 1 | 2 | 3 | 4 | 5 | 6 |
|---|---|---|---|---|---|---|
| Butyl | 200.0 | 200.0 | 200.0 | 200.0 | 200.0 | 200.0 |
| Unactivated EPC Black | 100.0 | | | | | |
| Unactivated Acetylene Black | | 100.0 | | | | |
| Unactivated Thermal Black | | | 100.0 | | | |
| Unactivated EPC Black+6% Bromine | | | | 100.0 | | |
| Unactivated Acetylene Black+6% Bromine | | | | | 100.0 | |
| Unactivated Thermal Black+3% Bromine | | | | | | 100.0 |
| Zinc Oxide | 10.0 | 10.0 | 10.0 | 10.0 | 10.0 | 10.0 |
| Stearic Acid | 6.0 | 6.0 | 6.0 | 6.0 | 6.0 | 6.0 |
| Benzothiazyl Disulfide | 1.0 | 1.0 | 1.0 | 1.0 | 1.0 | 1.0 |
| Tetramethylthiuram Disulfide | 2.0 | 0.5 | 0.5 | 2.0 | 0.5 | 0.5 |
| Sulfur | 4.0 | 4.0 | 4.0 | 4.0 | 4.0 | 4.0 |

TABLE II.—BUTYL PLY COMPOUND RECIPE

| | |
|---|---|
| Butyl rubber | 100.0 |
| High-abrasion furnace black | 50.0 |
| Para-quinone dioxime | 0.65 |
| Acetylene black | 5.0 |
| Zinc oxide | 5.0 |
| Stearic acid | 3.0 |
| Polar 45 | 3.0 |
| Benzothiazyl disulfide | 0.5 |
| Tetramethylthiuram disulfide | 1.0 |
| Sulfur | 2.0 |

(Polar 45 is a mineral oil plasticizer manufactured by Imperial Oil Limited, Sarnia, Ontario, Canada.)

TABLE III.—NATURAL RUBBER-KRYLENE PLY COMPOUND RECIPE

| | |
|---|---|
| #1 smoked sheet natural rubber | 40.0 |
| Krylene | 60.0 |
| Fast-extruding furnace black | 25.0 |
| High-modulus furnace black | 25.0 |
| Zinc oxide | 5.0 |
| Stearic acid | 1.0 |
| Phenyl beta-naphthylamine | 1.0 |
| Butac | 4.0 |
| Paraflux | 6.0 |
| n-Cyclohexyl-2-benzothiazole sulphenamide | 1.0 |
| Sulfur | 2.5 |

(Butac is a rosin acid based plasticizer and is a solid with a softening point of 145–150° C. and a specific gravity of 1.075–1.085, manufactured by the J. M. Huber Corp., New York, N. Y.)

(Paraflux is a polymerized hydrocarbon plasticizer manufactured by the C. P. Hall Co., Akron, Ohio.)

TABLE IV.—ADHESION

| Recipe No. | Adhesion (lbs./inch) |
|---|---|
| 1 | 6.0 |
| 2 | 7.0 |
| 3 | 6.0 |
| 4 | 7.7 |
| 5 | 9.0 |
| 6 | 6.0 |

The adhesion results listed in Table IV show that there is no advantage in using brominated unactivated carbon black over the conventional unbrominated unactivated carbon blacks.

*Example 2*

A sample of EPC black was activated in the following manner: A 500 gram sample of EPC black was placed in a glass column and steam, at atmospheric pressure, was passed through it for 30 minutes. The black was then dried to constant weight under vacuum at 100° C.

The dried activated EPC black was then brominated according to the method of Example A. It was found that the adsorptive capacity of the EPC black was doubled. 62.4 grams of bromine were adsorbed on 500 grams of the activated EPC black.

A sample of Butyl rubber containing approximately 1.8 mol percent unsaturation was compounded with the bromine-containing activated EPC black on a cold mill, as shown in Table V.

TABLE V.—TIE-GUM RECIPE

| | |
|---|---|
| Butyl rubber | 200.0 |
| Activated EPC black containing 12% bromine | 100.0 |
| Zinc oxide | 10.0 |
| Stearic acid | 6.0 |
| Benzothiazyl disulfide | 1.0 |
| Tetramethylthiuram disulfide | 2.0 |
| Sulfur | 4.0 |

Part of this tie-gum stock was cured for 40 minutes at 307° F., and tested, with the results being shown in Table VI.

TABLE VI.—PHYSICAL PROPERTIES OF TIE-GUM

| | |
|---|---|
| Tensile strength (p. s. i.) | 2440 |
| Elongation at break (percent) | 620 |
| Modulus at 300% (p. s. i.) | 835 |
| Shore A–2 hardness | 36 |

The rest of the tie-gum stock was formed into a sheet of 0.01 inch thickness. It was used as a tie-gum between two plies of rubber of 0.60 inch thickness. The first ply was prepared from a natural rubber smoked sheet as shown in Recipe 1 of Table VII, while the second ply prepared as shown in Recipe 2 of Table VII, using Butyl rubber of 1.8 mole percent unsaturation.

TABLE VII.—PLY COMPOUNDS

| | Recipe 1 | Recipe 2 |
|---|---|---|
| Smoked Sheet | 100.0 | |
| Butyl Rubber | | 100.0 |
| EPC Black | | 50.0 |
| Semi-Reinforcing Furnace Black | 40.0 | |
| Zinc Oxide | 3.0 | 5.0 |
| Stearic Acid | 1.0 | 3.0 |
| Phenyl beta-Naphthylamine | 2.0 | |
| Benzothiazyl Disulfide | 0.75 | 0.5 |
| Mercaptobenzothiazole | 0.75 | |
| Tetramethylthiuram Disulfide | 0.15 | 1.0 |
| Sulfur | 1.5 | 2.0 |

The three-ply assembly was cured for 20 minutes at 307° F., and was found to have an adhesion of 15 lbs./inch. This indicated that very good adhesion is attained when a tie-gum prepared from Butyl rubber according to the process of the present invention is used between Butyl rubber and natural rubber plies.

*Example 3*

Activated charcoal (Mallinckrodt Activated NF IX Charcoal, as supplied by Mallinckrodt Chemical Works Limited, Montreal, Quebec, Canada) was brominated according to the process of Example A. 31.2 grams of bromine were used for every 100 grams of the activated charcoal.

Samples of Butyl rubber containing about 1.8 mol percent unsaturation were mixed with varying amounts of the bromine-containing activated charcoal as prepared above, and compounded, on a cold mill, according to the tie-gum recipes given in Table VIII.

The ply compounds were prepared as shown in Recipes 1 and 2 of Table VII. The three-ply adhesion testing assemblies were cured for 30 minutes at 307° F. The adhesion for each sample is also given in Table VIII.

The second ply was based on a Butyl rubber containing about 1.8 mol percent unsaturation, as shown in Table XII.

TABLE VIII

| Sample No. | 1 | 2 | 3 | 4 | 5 | 6 | 7 | 8 |
|---|---|---|---|---|---|---|---|---|
| Masterbatches: | | | | | | | | |
| Butyl Rubber | 100.0 | 100.0 | 100.0 | 100.0 | 100.0 | 100.0 | 100.0 | 100.0 |
| Activated Charcoal+31.2% adsorbed Bromine | | 10.0 | 20.0 | 30.0 | 40.0 | 50.0 | 60.0 | 80.0 |
| Compounds: | | | | | | | | |
| Masterbatch | 50.0 | 55.0 | 60.0 | 65.0 | 70.0 | 75.0 | 80.0 | 90.0 |
| Zinc Oxide | 2.5 | 2.5 | 2.5 | 2.5 | 2.5 | 2.5 | 2.5 | 2.5 |
| Stearic Acid | 1.5 | 1.5 | 1.5 | 1.5 | 1.5 | 1.5 | 1.5 | 1.5 |
| Benzothiazyl Disulfide | 0.25 | 0.25 | 0.25 | 0.25 | 0.25 | 0.25 | 0.25 | 0.25 |
| Tetramethylthiuram Disulfide | 0.5 | 0.5 | 0.5 | 0.5 | 0.5 | 0.5 | 0.5 | 0.5 |
| Sulfur | 1.0 | 1.0 | 1.0 | 1.0 | 1.0 | 1.0 | 1.0 | 1.0 |
| Wt. Percent Bromine in Masterbatch | 0 | 2.2 | 4.0 | 5.5 | 6.8 | 7.9 | 8.9 | 10.6 |
| Adhesion (lbs./inch) | 2.7 | 7.7 | 20.8 | 20.9 | 19.9 | 19.8 | 15.5 | 7.7 |

These results indicate that Butyl rubber brominated according to the process of the present invention may be used satisfactorily as a tie-gum between Butyl rubber and natural rubber plies.

*Example 4*

Activated charcoal was brominated according to the process of Example B. 31.2 grams of bromine were used for every 100 grams of activated charcoal.

Samples of Butyl rubber containing about 1.8 mol percent unsaturation were mixed and compounded on a cold mill with varying amounts of bromine-containing activated charcoal in accordance with the recipes shown in Table IX.

TABLE IX.—BUTYL RUBBER-BROMINE-CONTAINING CHARCOAL MIXES

| Sample No. | 1 | 2 | 3 | 4 | 5 | 6 |
|---|---|---|---|---|---|---|
| Butyl Rubber | 200.0 | 200.0 | 200.0 | 200.0 | 200.0 | 200.0 |
| Activated Charcoal +31.2% Adsorbed Bromine | 20.0 | 40.0 | 60.0 | 20.0 | 40.0 | 60.0 |
| Activated Charcoal | 40.0 | 20.0 | | 40.0 | 20.0 | |

Each of these samples was compounded as shown below in Table X.

TABLE X.—BROMINATED BUTYL RUBBER TIE-GUM COMPOUND RECIPE

| | |
|---|---|
| Butyl rubber-Bromine-containing charcoal mix | 65.0 |
| Zinc oxide | 2.5 |
| Stearic acid | 1.5 |
| Benzothiazyl disulfide | 0.25 |
| Tetramethylthiuram disulfide | 0.125 |
| Sulfur | 1.0 |

Each compound was divided into two equal parts: one part was heated in an oven for 30 minutes at 300° F.; the other part was left untreated. Each compound was then passed three additional times through a cold mill, and was formed into a sheet of 0.01 inch thickness for the tie-gums for adhesion testing.

Two ply-forming compounds were prepared. The first was based on a natural rubber smoked sheet blended with a sample of Krylene "cold" rubber in the ratio of 40 parts to 60 parts as shown below in Table XI.

TABLE XI.—NATURAL RUBBER-KRYLENE RUBBER PLY COMPOUND RECIPE

| | |
|---|---|
| #1 smoked sheet | 40.0 |
| Krylene rubber | 60.0 |
| Fast extruding furnace black | 25.0 |
| High-modulus furnace black | 25.0 |
| Zinc oxide | 5.0 |
| Stearic acid | 1.0 |
| Phenyl beta-naphthylamine | 1.0 |
| Butac | 4.0 |
| Paraflux | 6.0 |
| n-Cyclohexyl-2-benzothiazole sulphenamide | 1.0 |
| Sulfur | 2.5 |

TABLE XII.—BUTYL RUBBER PLY COMPOUND RECIPE

| | |
|---|---|
| Butyl rubber | 100.0 |
| High-abrasion furnace black | 50.0 |
| Para-quinone dioxime | 0.65 |
| Acetylene black | 5.0 |
| Zinc oxide | 5.0 |
| Stearic acid | 3.0 |
| Polar-45 | 3.0 |
| Benzothiazyl disulfide | 0.5 |
| Tetramethylthiuram disulfide | 1.0 |
| Sulfur | 2.0 |

The adhesion testing assemblies were cured for 40 minutes at 292° F. The adhesion results are given below in Table XIII.

TABLE XIII.—ADHESION TEST RESULTS

| Sample No. | Heat Treated | Adhesion (lbs./inch) |
|---|---|---|
| 1 | No | 9.8 |
| 2 | No | 15.0 |
| 3 | No | 38.7 |
| 4 | Yes | 6.4 |
| 5 | Yes | 7.5 |
| 6 | Yes | 27.3 |

These results show that using Butyl rubber, brominated according to the process of the present invention, as tie-gums results in excellent adhesion between Butyl rubber and natural rubber-Krylene plies. In addition, it shows that heat treatment of the mix prior to its use as a tie-gum results in a reduction of adhesion of about 40%. Nevertheless the adhesion results still are satisfactory.

*Example 5*

Activated charcoal was brominated according to the process of Example B. 31.2 grams of bromine were used for every 100 grams of activated charcoal.

A sample of Butyl rubber containing about 1.8 mol percent unsaturation was mixed with the above-formed bromine-containing charcoal in the ratio of 100.0 parts Butyl rubber to 30.0 parts bromine-containing charcoal. This material was then compounded on a cold mill according to the tie-gum recipe given below in Table XIV.

TABLE XIV.—BUTYL RUBBER TIE-GUM RECIPE

| | |
|---|---|
| Masterbatch | 130.0 |
| EPC black | 20.0 |
| Zinc oxide | 5.0 |
| Stearic acid | 3.0 |
| Benzothiazyl disulfide | 0.5 |
| Tetramethylthiuram disulfide | 0.25 |
| Sulfur | 2.0 |

This compound was formed into sheets of 0.050 inch thickness. It was used as a tie-gum to join a Butyl rubber ply, compounded as shown in Table XII, and a natural rubber-Krylene ply, compounded as shown in Table XI.

Triplicate assemblies were made up and cured for 40 minutes at 292° F. The adhesion values obtained were 30, 30 and 40 lbs./linear inch. These results indicate that excellent adhesion is obtained using Butyl rubbers compounded with about 23 grams of activated charcoal containing about 7 grams of bromine for each 100 grams of Butyl rubber.

The testing of the samples in the above examples for adhesive strength is given below in Example C.

EXAMPLE C

The two ply-forming materials and the brominated butyl tie-gum-forming polymer prepared according to the process of the present invention were compounded in the desired recipes. They were then made into sheets of the required thickness, the brominated butyl tie-gum-forming polymer being about 0.01 inch thick, while the ply-forming compounds were about 0.10 inch thick. A piece about 9 inches by 3 inches was cut out of each sheet. One of the two ply-forming materials was placed on a flat surface and the brominated butyl tie-gum-forming polymer was placed on top of it. A strip of holland cloth about 1½ inches wide was placed between the surfaces across one end of the assembly, so as to facilitate the separation of the ends following vulcanization. (The holland cloth used was that sold under the trade name Bradex #3 by the Hollister Mills Incorporated, Norwood, Mass.) The assembly was rolled with a metal roller, then the other ply-forming piece was placed on top of the tie-gum layer and the assembly was rolled again. A layer of 18 oz. cotton duck fabric was placed on each outer surface of the assembly prior to vulcanization. The fabric served to prevent stretching during the adhesion tests.

To measure the adhesion between the surfaces, a strip about one inch wide was cut down the center of the cured assembly. The two free ends (which were separated by the holland cloth) were clamped into a separating device. The surfaces were then separated at a rate of two inches per minute, at room temperature. The maximum load recorded was taken as the adhesion value, in lbs./inch. The separating device used was an Instron Tester, which is a testing instrument manufactured by the Instron Engineering Corp., Quincy, Mass.

What we claim is:

1. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with bromine-containing activated carbon black containing at least 2 parts by weight of bromine per 100 parts by weight of polymer.

2. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with bromine-containing activated carbon black containing 4–9 parts by weight of bromine per 100 parts by weight of polymer.

3. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with about 4–70 parts by weight of bromine-containing activated carbon black per 100 parts by weight of polymer, said bromine-containing activated carbon black containing about 2–35 parts by weight of bromine per 100 parts by weight of polymer.

4. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with 20–60 parts by weight of bromine-containing activated carbon black per 100 parts by weight of polymer, said bromine-containing activated carbon black containing 4–9 parts by weight of bromine per 100 parts by weight of polymer.

5. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with bromine-containing activated charcoal containing about 2–35 parts by weight of bromine per 100 parts by weight of polymer.

6. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with bromine-containing activated charcoal containing 4–9 parts by weight of bromine per 100 parts by weight of polymer.

7. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with about 4–80 parts by weight of bromine-containing activated charcoal per 100 parts by weight of polymer, said bromine-containing activated charcoal containing about 2–35 parts by weight of bromine per 100 parts by weight of polymer.

8. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4–14 carbon atoms and selected from the group consisting of acyclic diolefins, acyclic triolefins, alicyclic triolefins which process comprises intimately commingling said polymer with about 20–60 parts by weight of bromine-containing activated charcoal per 100 parts by weight of polymer, said bromine containing activated charcoal containing 4–9 parts by weight of bromine per 100 parts by weight of polymer.

9. A process for the bromination of a solid, olefinically unsaturated polymer composed of a major portion of an isoolefinic hydrocarbon containing 4 to 8 carbon atoms and a terminal methylene group connected by a double bond to another carbon atom and a minor portion of a polyolefinic hydrocarbon containing 4-14 carbon atoms and selected from the group consisting of acyclic diolefins, acyclic triolefins, alicyclic triolefins which process comprises intimately commingling said polymer with 20-60 parts by weight of bromine-containing activated vegetable charcoal per 100 parts by weight of said copolymer, said charcoal containing 4-9 parts by weight of bromine per 100 parts by weight of said copolymer.

10. A process for the bromination of an isobutylene-isoprene copolymer which process comprises intimately commingling said copolymer with 20-60 parts by weight of bromine-containing activated vegetable charcoal per 100 parts by weight of said copolymer, said charcoal containing 4-9 parts by weight of bromine per 100 parts by weight of said copolymer.

11. A process as claimed in claim 9 wherein the polymer is a copolymer of isobutylene and butadiene-1,3.

12. A process as claimed in claim 9 wherein the polymer is a copolymer of isobutylene and 2,3-dimethylbutadiene.

13. A process as claimed in claim 9 wherein the polymer is composed of 89.0-99.9% by weight of isoolefinic hydrocarbon and correspondingly from 11.0-0.1% by weight of polyolefinic hydrocarbon.

References Cited in the file of this patent
UNITED STATES PATENTS

| | | |
|---|---|---|
| 2,631,984 | Crawford et al. | Mar. 17, 1953 |
| 2,732,354 | Morrissey et al. | Jan. 24, 1956 |
| 2,816,098 | Morrissey | Dec. 10, 1957 |